(12) United States Patent
Steinmann

(10) Patent No.: US 6,492,478 B1
(45) Date of Patent: Dec. 10, 2002

(54) POLYMERS WITH CROSSLINKABLE PENDENT GROUPS

(75) Inventor: Bettina Steinmann, Praroman-Le Mouret (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/269,455

(22) PCT Filed: Oct. 17, 1997

(86) PCT No.: PCT/EP97/05738

§ 371 (c)(1),
(2), (4) Date: Mar. 26, 1999

(87) PCT Pub. No.: WO98/17704

PCT Pub. Date: Apr. 30, 1998

(30) Foreign Application Priority Data

Oct. 21, 1996 (EP) .............................................. 96810700

(51) Int. Cl.$^7$ ............................................... C08F 26/06
(52) U.S. Cl. ...................... 526/258; 526/260; 526/266; 526/227; 526/273; 526/323.1
(58) Field of Search ................................ 526/258, 260, 526/266, 227, 273, 323.1

(56) References Cited

U.S. PATENT DOCUMENTS

| | | | | |
|---|---|---|---|---|
| 4,112,190 A | * | 9/1978 | Sato et al. ................... | 428/457 |
| 4,494,825 A | * | 1/1985 | Sasaki et al. ............... | 350/343 |
| 5,039,769 A | | 8/1991 | Molock ....................... | 526/301 |
| 5,204,223 A | * | 4/1993 | Taguci et al. ............... | 430/281 |
| 5,428,057 A | | 6/1995 | Kim ............................ | 523/443 |
| 6,162,510 A | * | 12/2000 | Kashiwazaki et al. ....... | 427/511 |

OTHER PUBLICATIONS

Synthesis of Reactive Polyesters by a Regioselective Addition Reaction of Diepoxides with Diacyl Chlorides and Their Chemical Modification Kameyama, Atsuishi, et al, Macromolecules 25 (1992) Apr. 27, No. 9, Washington, DC.
Synthesis of New Hybrid Monomers and Oligomers Containing Cationic and Radical Polymerizable Vinyl Groups and Their Photoinitiated Polymerization, Itoh, Hideyuki, et al., Journal of Polymer Science: Part A: Polymer Chemistry, vol. 34, 217–225 (1996).

* cited by examiner

Primary Examiner—David W. Wu
Assistant Examiner—Tanya Zalukaeva
(74) Attorney, Agent, or Firm—R. Scott Meece; Jian S. Zhou; Richard I. Gearhart

(57) ABSTRACT

The invention relates to novel crosslinkable prepolymers comprising structural units of the formula

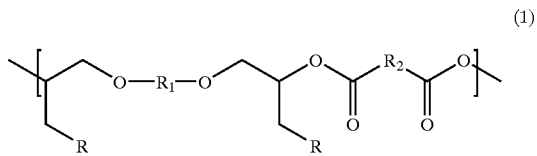

(1)

wherein the variables are as defined in the claims, to crosslinked polymers, to either homo-polymers or copolymers prepared from those novel prepolymers, to mouldings produced from the said homo- or co-polymers, and especially to contact lenses produced from those homo- or co-polymers.

17 Claims, No Drawings

POLYMERS WITH CROSSLINKABLE PENDENT GROUPS

The present invention relates to novel water-soluble block copolymers comprising polyoxyalkylene units and having crosslinkable side groups, to processes for their preparation, and to their use in the production of mouldings, especially contact lenses.

Polymers comprising polyalkylene oxide and having polymerisable end groups and their use in the production of contact lenses are already known, for example from EP-A-273 763.

Furthermore, there are known, for example from A. Kameyama et al. Macromol. 25, 2307 (1992), H. Itoh et al. Macromol. 28, 883 (1995) or H. Itoh et al. J. Pol. Sci. A, Pol. Chem. 34, 217 (1996), polyesters having chloromethyl side groups, polymers derived therefrom that have side groups comprising carboxy groups, and polyesters having vinyl ether side groups.

Surprisingly, novel crosslinkable polyether-polyester copolymers have now been found, which are suitable especially for the production of contact lenses.

The present invention relates to prepolymers comprising structural units of the formula

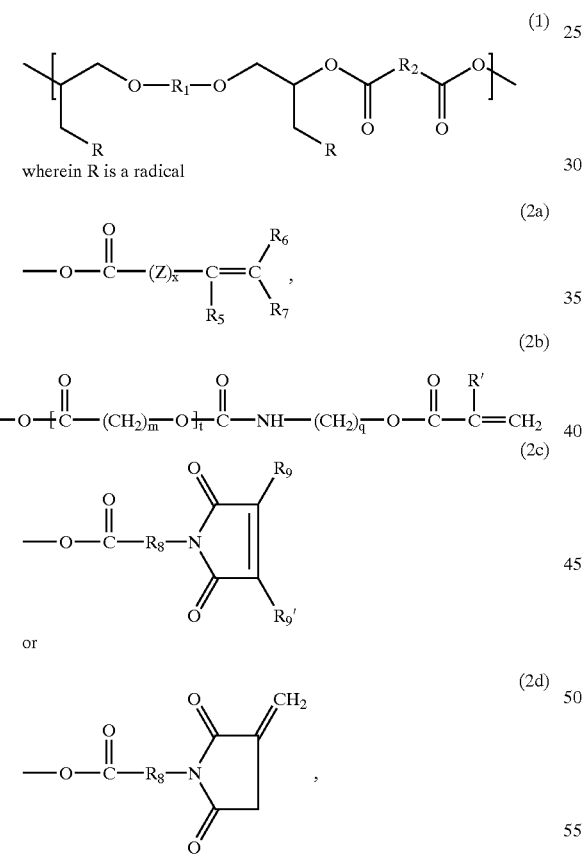

wherein R is a radical

Z is straight-chained or branched $C_1$–$C_{12}$alkylene or unsubstituted or $C_1$–$C_4$alkyl- or $C_1$–$C_4$-alkoxy-substituted phenylene or $C_7$–$C_{12}$aralkylene, x and t are each independently of the other the number 0 or 1, $R_5$ is hydrogen, $C_1$–$C_4$alkyl or halogen, $R_6$ is hydrogen, $C_1$–$C_4$alkyl, phenyl, carboxy or halogen, $R_7$ is hydrogen when $R_6$ is phenyl or carboxy, or is hydrogen or carboxy when $R_6$ is hydrogen, $C_1$–$C_4$alkyl or halogen, $R_8$ is a $C_2$–$C_{12}$alkylene radical, a phenylene radical or a $C_7$–$C_{12}$aralkylene radical, $R_9$ and $R_9'$ are each independently of the other hydrogen, $C_1$–$C_4$alkyl or halogen, $R_1$ is a radical of the formula $$-[CH_2-CHR''-O]_n-CH_2-CHR''- \qquad (3a)$$

$$\text{or}$$

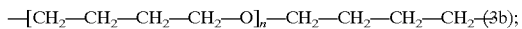 (3b);

or an alkylene radical having up to 20 carbon atoms which may be interrupted by one or more ester, urethane or ureido groups and/or may be substituted by hydroxy; or a cycloalkylene radical having from 6 to 20 carbon atoms; or an arylene radical having from 6 to 20 carbon atoms; or an arylenealkylene, alkylenearylene, alkylenearylenealkylene or arylenealkylenearylene radical, $R_2$ is a radical of the formula $$-CH_2-[CH_2-CHR^*-O]_p-CH_2- \qquad (4)$$

$$\text{or}$$

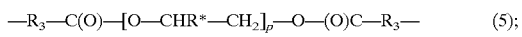 (5);

or an alkylene radical having up to 20 carbon atoms which may be interrupted by one or more ester, urethane or ureido groups and/or may be substituted by hydroxy; or a cycloalkylene radical having from 6 to 20 carbon atoms; or an arylene radical having from 6 to 20 carbon atoms; or an arylenealkylene, alkylenearylene, alkylenearylenealkylene or arylenealkylenearylene radical, R', R" and R* are each independently of the others hydrogen or $C_1$–$C_4$alkyl, $R_3$ is an alkylene radical having up to 20 carbon atoms; or a cycloalkylene radical having from 6 to 20 carbon atoms; or an arylene radical having from 6 to 20 carbon atoms, and n, m, p and q are each independently of the others a number from 1 to 30, with the proviso that at least one of the radicals $R_1$ and $R_2$ is a radical of formula (3a), (3b), (4) or (5).

Z as an alkylene radical is preferably linear or branched $C_1$–$C_8$alkylene, especially linear $C_1$–$C_4$alkylene and more especially linear $C_1$–$C_2$alkylene. In a preferred embodiment of the invention, Z is methylene.

Z as a phenylene radical is, for example, unsubstituted or methyl- or methoxy-substituted 1,2-, 1,3- or 1,4-phenylene. Z as a phenylene radical is preferably 1,3- or 1,4-phenylene.

Z as an aralkylene radical is, for example, unsubstituted or methyl- or methoxy-substituted benzylene, the methylene group in each case being bonded to the amine nitrogen. Z as an aralkylene radical is preferably the 1,3- or 1,4-phenylenemethylene radical, the methylene group in each case being bonded to the amine nitrogen —NH—.

Z is preferably unsubstituted or methyl- or methoxy-substituted phenylene or phenylenemethylene or $C_1$–$C_8$alkylene, especially 1,3- or 1,4-phenylene or $C_1$–$C_4$alkylene, more especially $C_1$–$C_2$alkylene and most especially methylene.

x is preferably the number 0. t is preferably the number 1.

$R_5$ is preferably hydrogen, $C_1$–$C_4$alkyl or chlorine, especially hydrogen or $C_1$–$C_4$alkyl, more especially hydrogen, methyl or ethyl and most especially hydrogen or methyl.

$R_6$ is preferably hydrogen, methyl or phenyl and especially hydrogen.

$R_7$ is preferably hydrogen.

$R_8$ is preferably a $C_2$–$C_6$alkylene radical or a 1,3- or 1,4-phenylene radical, especially a $C_2$–$C_3$alkylene radical.

$R_9$ and $R_9'$ are each independently of the other preferably hydrogen, methyl or chlorine. $R_9$ and $R_9'$ are each independently of the other especially hydrogen or methyl.

Each of R', R" and R* as $C_1$–$C_4$alkyl is preferably methyl or ethyl and especially methyl.

R' and R" are each independently of the other preferably hydrogen, methyl or ethyl and especially hydrogen or methyl.

R* is especially hydrogen or methyl and more especially hydrogen.

m is preferably a number from 1 to 6 and especially a number from 1 to 4. q is, for example, a number from 1 to 6, preferably a number from 2 to 4 and especially the number 2.

R in formula (1) is preferably a radical of the formula

—O—(O)C—CR$_5$=CH$_2$ (2a') or

—O—(O)C—(CH$_2$)$_m$—O—(O)C—NH—(CH$_2$)$_q$—O—(O)C—CR'=CH$_2$ (2b'), wherein the variables contained therein each have the meanings and preferred meanings indicated above.

In an especially preferred embodiment of the invention, R in formula (1) is a radical of formula (2a') indicated above wherein $R_5$ is hydrogen or methyl.

In formulae (3a) and (3b), n is, for example, a number from 5 to 30, advantageously from 5 to 25, preferably from 8 to 25 and especially from 10 to 25.

When $R_1$ is an alkylene radical it is, for example, straight-chained or branched $C_1$–$C_{20}$-alkylene which is unsubstituted or substituted, for example by hydroxy, and/or, with the exception of methylene, may be interrupted by one or more groups —COO—, —OCO—, —NHCO—O—, —OCONH— or —NHCONH—. $R_1$ as an alkylene radical is preferably unsubstituted or hydroxy-substituted $C_1$–$C_{20}$alkylene, especially unsubstituted $C_1$–$C_{12}$alkylene and more especially unsubstituted $C_1$–$C_6$alkylene. Examples of alkylene radicals $R_1$ that are very especially preferred are methylene, 1,2-ethylene, 1,3-propylene and 1,4-butylene.

$R_1$ as cycloalkylene is, for example, 1,2-, 1,3- or 1,4-cyclohexylene which may be substituted by $C_1$–$C_4$alkylene, or is a radical of the formula

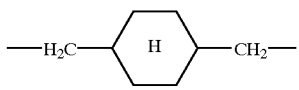

$R_1$ as arylene is, for example, 1,2-, 1,3- or 1,4-phenylene which is unsubstituted or is substituted by $C_1$–$C_4$alkyl, $C_1$–$C_4$alkoxy or by halogen, or is a radical of the formula

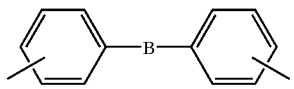

wherein B is, for example, a group —O—, —NH—, —OCO—, —CONH— or —NHCONH—. $R_1$ as arylene is preferably 1,2-, 1,3- or 1,4-phenylene.

$R_1$ as arylenealkylene, alkylenearylene or alkylenearylenealkylene is, for example, a radical —C$_6$H$_5$—C$_1$–C$_4$alkylene—, —C$_1$–C$_4$alkylene-C$_6$H$_5$— or —C$_1$–C$_4$alkylene-C$_6$H$_5$—C$_1$–C$_4$alkylene, preferably the radical —C$_6$H$_5$—CH$_2$—, —CH$_2$—C$_6$H$_5$— or —CH$_2$—C$_6$H$_5$—CH$_2$—.

$R_1$ as arylenealkylenearylene is, for example, a radical of the formula

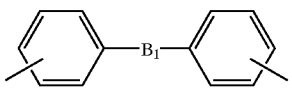

wherein $B_1$ is straight-chained or branched $C_1$–$C_6$alkylene which is unsubstituted or is substituted by hydroxy, preferably straight-chained or branched $C_1$–$C_4$alkylene. Examples of suitable radicals $B_1$ are —CH$_2$—, —C(CH$_3$)$_2$— and —CH$_2$—CH$_2$—.

$R_1$ is advantageously a radical of formula (3a) or (3b) indicated above, or $C_1$–$C_{20}$alkylene, 1,2-, 1,3- or 1,4-phenylene or a radical of the formula

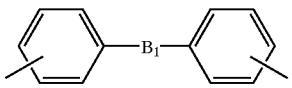

wherein $B_1$ is straight-chained or branched $C_1$–$C_4$alkylene.

$R_1$ is preferably a radical of formula (3a) indicated above, or $C_1$–$C_{20}$alkylene, especially a radical of formula (3a) indicated above wherein n is a number from 5 to 25 and R" is hydrogen or methyl, or $C_1$–$C_{12}$alkylene, and more especially a radical of formula (3a) indicated above wherein n is a number from 8 to 25 and R" is hydrogen or methyl, or $C_1$–$C_6$-alkylene.

In formulae (4) and (5), p is preferably a number from 5 to 25, especially from 8 to 25 and more especially from 10 to 25.

$R_3$ as an alkylene radical is preferably straight-chained or branched $C_1$–$C_{12}$alkylene, especially straight-chained or branched $C_1$–$C_6$alkylene and more especially straight-chained or branched $C_1$–$C_4$alkylene. Examples of alkylene radicals $R_4$ that are very especially preferred are methylene, 1,2-ethylene, 1,3-propylene and 1,4-butylene.

When $R_3$ is a cycloalkylene or arylene radical, the definitions and preferred meanings mentioned above for $R_2$ apply independently.

$R_3$ is preferably a straight-chained $C_1$–$C_4$alkylene radical.

When $R_2$ is an alkylene, cycloalkylene, arylene, arylenealkylene, alkylenearylene, alkylenearylenealkylene or arylenealkylenearylene radical, the definitions and preferred meanings given above for $R_1$ apply independently.

$R_2$ is preferably a radical of formula (4) or (5) indicated above, or $C_1$–$C_{20}$alkylene, 1,2-, 1,3- or 1,4-phenylene or a radical of the formula

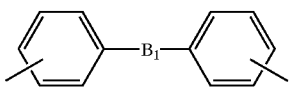

wherein $B_1$ is straight-chained or branched $C_1$–$C_4$alkylene.

$R_2$ is especially a radical of formula (4) indicated above, or $C_1$–$C_{20}$alkylene, more especially a radical of formula (4) indicated above wherein p is a number from 5 to 25 and R* is hydrogen or methyl, or $C_1$–$C_{12}$alkylene, and most especially a radical of formula (4) indicated above wherein p is a number from 8 to 25 and R" is hydrogen, or $C_1$–$C_6$alkylene.

A preferred embodiment of the present invention relates to prepolymers comprising structural units of formula (1) indicated above wherein $R_1$ is a radical of formula (3a) indicated above and $R_2$ is a $C_1$–$C_{20}$alkylene radical. Special preference is given to such polymers in which $R_1$ is a radical of formula (3a) indicated above wherein n is a number from 5 to 25 and R" is hydrogen or methyl, and $R_2$ is $C_1$–$C_6$alkylene.

Another preferred embodiment of the present invention relates to prepolymers comprising structural units of formula (1) indicated above wherein $R_1$ is a $C_1$–$C_{20}$alkylene radical and $R_2$ is a radical of formula (4) indicated above. Special preference is given to such polymers in which $R_1$ is $C_1$–$C_6$alkylene and $R_2$ is a radical of formula (4) indicated above wherein p is a number from 5 to 25 and R* is hydrogen.

Another preferred embodiment of the present invention relates to prepolymers comprising structural units of formula (1) indicated above wherein the above-mentioned definitions and preferred meanings apply to each of $R_1$ and $R_2$, and R is the acrylate or methacrylate radical —O(O)C—CH═CH$_2$ or —O(O)C—C(CH$_3$)═CH$_2$.

In addition to the structural units of formula (1) mentioned above, the prepolymers of the invention may comprise, for example, structural units of the formula

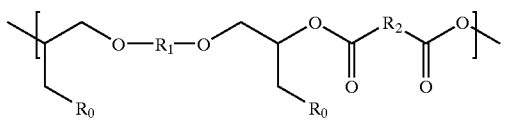

(1a)

wherein $R_0$ is halogen or a radical —O—(O)C—$R_4$ and $R_4$ is $C_1$–$C_{20}$alkyl, $C_6$–$C_{20}$cycloalkylene, $C_6$–$C_{20}$arylene or $C_7$–$C_{12}$aralkylene.

When $R_0$ is halogen, it may be, for example, fluorine, bromine, iodine or, especially, chlorine.

$R_4$ as alkyl is, for example, a straight-chained or branched $C_1$–$C_{20}$alkyl radical which is unsubstituted or is substituted by hydroxy, preferably a straight-chained or branched $C_1$–$C_{12}$alkyl radical and especially a straight-chained or branched $C_1$–$C_6$alkyl radical. Examples are methyl, ethyl, n- or iso-propyl, n-, iso-, sec- or tert-butyl or straight-chained or branched pentyl or hexyl and, especially, methyl or ethyl.

$R_4$ as cycloalkyl is, for example, unsubstituted or $C_1$–$C_4$alkyl-substituted cyclohexyl, preferably cyclohexyl which is unsubstituted or is substituted by from 1 to 3 methyl groups, and especially unsubstituted cyclohexyl.

$R_4$ as aryl is, for example, phenyl which is unsubstituted or is substituted by halogen, hydroxy, carboxy, $C_1$–$C_4$alkyl or by $C_1$–$C_4$alkoxy, preferably phenyl which is unsubstituted or is substituted by chlorine, methyl, methoxy or by carboxy, and especially unsubstituted phenyl.

$R_4$ as aralkyl is, for example, phenylmethyl or phenylethyl.

$R_4$ is preferably $C_1$–$C_{12}$alkyl, cyclohexyl which is unsubstituted or is substituted by from 1 to 3 methyl groups, phenyl which is unsubstituted or is substituted by chlorine, methyl, methoxy or by carboxy, or phenylmethyl or phenylethyl.

$R_4$ is especially $C_1$–$C_6$alkyl, cyclohexyl or phenyl.

Preferred constituents of the prepolymers of the invention are those units of formula (1a) wherein $R_0$ is chlorine or a radical —O—(O)C—$R_4$ and $R_4$ is $C_1$–$C_6$alkyl, cyclohexyl or phenyl.

The crosslinkable prepolymers of the invention comprise, for example, from 100 to 60 mol. % of units of formula (1) and from 0 to 40 mol. % of units of formula (1a). Preference is given to such polymers that comprise from 100 to 80 mol. % of units of formula (1) and from 0 to 20 mol. % of units of formula (1a).

The crosslinkable prepolymers of the invention can be prepared, for example, by (a) polymerising a compound of the formula

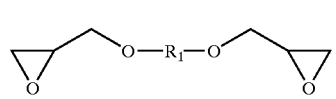

(6)

with a compound of the formula

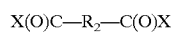 (7)

in the presence of a catalyst, and (b) reacting the polymer obtainable according to (a), which comprises structural units of the formula

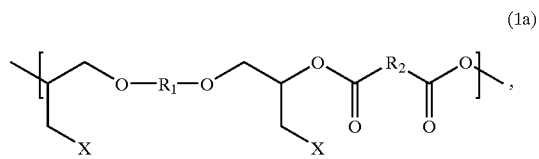

(1a)

with a compound of the formula

R—H  (8)

in the presence of a base, $R_1$ and $R_2$ each being as defined above, X being halogen, preferably chlorine, and R being a radical of formula (2a), (2c), (2d) or (2b) indicated above wherein t is the number 1.

The compounds of formula (1) wherein R is a radical of formula (2b) and t is the number 0 can be obtained, for example, by converting a polymer of formula (1a) prepared in the manner described above into a corresponding polymer wherein X is hydroxy and reacting the latter with an isocyanate of the formula O═C═N—(CH$_2$)$_q$—O—(O)C—CHR'═CH$_2$ wherein R' and q are as defined above.

The reaction of the diacid dihalide with the diglycidyl compound to form a polyester according to step (a) is known per se and can be carried out by methods known per se. The reaction of the acid dihalide with the diglycidyl compound is usually carried out in an inert solvent, for example in a higher-boiling alkane or alkane mixture, such as petroleum ether, in a xylene mixture or in toluene, at elevated temperature, for example at from 30 to 120° C., preferably from 40 to 100° C. and especially from 60 to 100° C., in the presence of a basic catalyst.

Suitable catalysts are, for example, crown ether complexes, pyridine, quaternary phosphonium salts, tertiary amines or, preferably, quaternary ammonium salts. Examples of suitable catalysts are pyridine, tri-$C_1$–$C_4$alkylamines, especially tributylamine, and tetra-$C_1$–$C_4$alkyl-ammonium halides, especially tetrabutylammonium halides, such as tetrabutylammonium chloride, tetrabutylammonium iodide or, especially, tetrabutylammonium bromide.

The catalyst is used in the polymerisation reaction, for example, in a molar ratio of from 1:10 to 1:50, preferably from 1:15 to 1:30 and especially of about 1:20, in each case based on the diacid dihalide. The molar ratio of diglycidyl compound to diacid dihalide can vary, for example, from 0.5:1 to 2:1 and is preferably about 1:1.

The reaction of the halide-group-containing polyester obtainable according to (a) with the carboxylic acid of formula (8) is advantageously carried out at elevated temperature, for example at from 30 to 100° C., preferably from 40 to 100° C. and especially from 60 to 90° C., in an aprotic-dipolar solvent, for example in DMSO, in the presence of a base, 1,8-diaza-bicyclo[5.4.0]undec-7-ene (DBU) having proved especially advantageous. The acid is used in a molar excess, based on the halide-group-containing polymer, and the base is advantageously present in about equimolar amounts, based on the acid of formula (8).

Depending on the chosen stoichiometric ratios and reaction conditions, the prepolymer of the invention obtainable after isolation in customary manner consists essentially of structural units of formula (1) indicated above or comprises, in addition to the structural units of formula (1), structural units of formula (1a) indicated above wherein $R_0$ is halogen. If step (b) is carried out using a mixture of an acid of formula (8) indicated above and an acid of the formula

$$R_4\text{—}C(O)\text{—}O\text{—}H \quad (9)$$

wherein $R_4$ is as defined above, the prepolymer comprises a mixture of structural units of formula (1), structural units of formula (1a) wherein $R_0$ is a radical —O—(O)C—$R_4$, and, where appropriate, structural units of formula (1a) wherein $R_0$ is halogen.

The prepolymers of the invention are crosslinkable but are uncrosslinked or at least substantially uncrosslinked; moreover, they are stable, that is to say spontaneous crosslinking by homopolymerisation does not take place.

The prepolymers of the invention are advantageously liquid or readily meltable or water-soluble; their average molecular weight can vary within wide limits. An average molecular weight of, for example, from 1000 to 20 000 has proved advantageous for the prepolymers of the invention.

Furthermore, the prepolymers comprising structural units of formula (1) and, where appropriate, (1a) can be purified in a manner known per se, for example by precipitation with acetone, dialysis or ultrafiltration, with ultrafiltration being especially preferred. By means of that purification process it is possible to obtain the prepolymers of the invention in an extremely pure form, for example in the form of solvent-free liquids or melts or in the form of concentrated aqueous solutions that are free or at least substantially free of reaction products, such as salts, and of starting materials or other non-polymeric constituents.

The preferred process for purifying the prepolymers of the invention, ultrafiltration, can be carried out in a manner known per se. It is possible to carry out the ultrafiltration repeatedly, for example from two to ten times. Alternatively, the ultrafiltration can be carried out continuously until the desired degree of purity has been achieved. The degree of purity can in principle be as high as desired and is preferably so adjusted that the content of undesirable constituents in the prepolymers is, for example, $\leq 0.001\%$, especially $\leq 0.0001\%$ (1 ppm). The prepolymers may, for example depending on their synthesis, comprise in addition constituents that are acceptable from a physiological point of view, for example sodium chloride, such constituents advantageously being present in an amount of $\leq 1\%$, preferably $\leq 0.1\%$ and especially $\leq 0.01\%$.

As has already been mentioned above, the prepolymers of the invention comprising structural units of formula (1) and, where appropriate, (1a) are crosslinkable in an extremely effective and specific manner, especially by means of photocrosslinking.

Accordingly, the present invention relates also to a polymer that can be obtained by photocrosslinking a prepolymer comprising units of formula (1) and, where appropriate, (1a), in the absence or presence of an additional vinyl comonomer. Those crosslinked polymers are insoluble in water.

In the photocrosslinking, a photoinitiator capable of initiating radical crosslinking is suitably added. Examples thereof are known to the person skilled in the art, but there may be mentioned specifically as suitable photoinitiators benzoin methyl ether, 1-hydroxycyclohexyl phenyl ketone, Darocure 1173 or Irgacure types. Crosslinking can then be induced by actinic radiation, for example UV light, or ionising radiation, for example gamma radiation or X-rays.

Photopolymerisation can be carried out without the addition of a solvent, for example when the prepolymer is liquid or readily meltable, or takes place in a suitable solvent. Suitable solvents are in principle any solvents that dissolve the polymers of the invention and the vinyl comonomers that may additionally be used, for example water, alcohols, such as lower alkanols, for example ethanol or methanol, also carboxylic acid amides, such as dimethyl-formamide, or dimethyl sulfoxide, as well as mixtures of suitable solvents, for example mixtures of water with an alcohol, for example a water/ethanol or water/methanol mixture.

Photocrosslinking is preferably carried out without a solvent or substantially without a solvent or directly from an aqueous solution of the prepolymers of the invention (which solution can be obtained as a result of the preferred purification step, ultrafiltration), where appropriate after the addition of an additional vinyl comonomer. For example, photocrosslinking of an approximately 15 to 90% strength aqueous solution can be carried out.

The process for the preparation of the crosslinked polymers of the invention comprises, for example, photocrosslinking a prepolymer comprising units of formula (1) and, where appropriate, (1a), especially in substantially pure form, that is to say, for example, after ultra-filtration once or several times, without a solvent or substantially without a solvent or in solution, especially in an aqueous solution, in the absence or presence of an additional vinyl comonomer.

The vinyl comonomer that may additionally be used according to the invention in the photocrosslinking may be hydrophilic, hydrophobic or a mixture of a hydrophobic and a hydrophilic vinyl monomer. Suitable vinyl monomers include especially those which are customarily used in the production of contact lenses. A hydrophilic vinyl monomer is understood as being a monomer that, as a homopolymer, typically yields a polymer that is water-soluble or can absorb at least 10% by weight water. By analogy, a hydrophobic vinyl monomer is understood as being a monomer that, as a homopolymer, typically yields a polymer that is insoluble in water and can absorb less than 10% by weight water.

In general, approximately from 0.01 to 80 units of a typical vinyl comonomer react per unit of formula (1) and, as the case may be, (1a).

The proportion of vinyl comonomers, where used, is preferably from 0.5 to 80 units per unit of formula (1), especially from 1 to 30 units of vinyl comonomer per unit of formula (1) and more especially from 5 to 20 units per unit of formula (1).

It is further preferred to use a hydrophobic vinyl comonomer or a mixture of a hydrophobic vinyl comonomer and a hydrophilic vinyl comonomer, the mixture containing at least 50% by weight of a hydrophobic vinyl comonomer. In this manner, the mechanical properties of the polymer can be improved without the water content dropping substantially. In principle, however, both conventional hydrophobic vinyl comonomers and conventional hydrophilic vinyl comonomers are suitable for the copolymerisation with a prepolymer comprising groups of formula (1).

Suitable hydrophobic vinyl comonomers include the following, this list not being exhaustive: $C_1$–$C_{18}$alkyl acrylates and methacrylates, $C_3$–$C_{18}$alkyl-acrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. Preference is given, for example, to $C_1$–$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilytoxy-silyl-propyl methacrylate, 3-methacryloxypropylpentamethyidisiloxane and bis(methacryloxypropyl)tetramethyidisiloxane.

Suitable hydrophilic vinyl comonomers include the following, this list not being exhaustive: hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl-acrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino-(the term "amino" also including quaternary ammonium), mono-lower alkylamino- or di-lower alkylamino-lower alkyl acrylates and methacrylates, allyl alcohol and the like. Preference is given, for example, to hydroxy-substituted $C_2$–$C_4$alkyl (meth)acrylates, five- to seven-membered N-vinyllactams, N,N-di-$C_1$–$C_4$alkyl(meth)acrylamides, and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinyl comonomers are methyl methacrylate and vinyl acetate.

Preferred hydrophilic vinyl comonomers are 2-hydroxyethyl methacrylate, N-vinyl-pyrrolidone and acrylamide.

The prepolymers of the invention can be processed in a manner known per se to form mouldings, especially contact lenses, for example by carrying out the photocrosslinking of the prepolymers of the invention in a suitable contact lens mould. Accordingly, the invention relates also to mouldings consisting essentially of a prepolymer of the invention. Other examples of mouldings of the invention, in addition to contact lenses, are biomedical mouldings and, especially, ophthalmic mouldings, for example intraocular lenses, eye dressings, mouldings for use in surgery, such as heart valves, artificial arteries or the like, and also films or membranes, for example membranes for controlling diffusion, photostructurable foils for information storage, or photoresist materials, for example membranes or mouldings for etching resist or screen printing resist.

A preferred process for the production of mouldings comprises the following steps:
a) introducing into a mould a prepolymer comprising structural units of formula (1) and, where appropriate, (1a) that is liquid at room temperature or is readily meltable and is substantially free of solvents, in the absence or presence of an additional vinyl comonomer and/or photoinitiator,
b) inducing the photocrosslinking,
c) opening the mould so that the moulding can be removed from the mould.

Another preferred process for the production of mouldings comprises the following steps:
a) preparing a substantially aqueous solution of a water-soluble prepolymer comprising structural units of formula (1) and, where appropriate, (1a) in the absence or presence of an additional vinyl comonomer and/or photoinitiator,
b) introducing the resulting solution into a mould,
c) inducing the photocrosslinking,
d) opening the mould so that the moulding can be removed from the mould.

In the preferred processes outlined above it is in each case especially preferred to introduce the prepolymer into the mould in the absence of an additional vinyl comonomer and in the presence of a photoinitiator.

For the introduction of the prepolymers of the invention into a mould, processes known per se can be used, such as, especially, conventional metering in, for example by means of dropwise introduction. If vinyl comonomers are present, the above-mentioned comonomers in the amounts mentioned there are suitable. Vinyl comonomers that may be present are advantageously first mixed with the prepolymer of the invention and then introduced into the mould.

Appropriate moulds are manufactured, for example, from polypropylene. Suitable materials for reusable moulds are, for example, quartz, sapphire glass or metals.

When the mouldings to be produced are contact lenses, they can be produced in a manner known per se, for example in a conventional "spin-casting mold", as described, for example, in U.S. Pat. No. 3,408,429, or by the so-called full-mold process in a static mould, as described, for example, in U.S. Pat. No. 4,347,198.

The photocrosslinking can be induced in the mould, for example by actinic radiation, e.g. UV light, or ionising radiation, e.g. gamma radiation or X-rays.

As has already been mentioned, the photocrosslinking is advantageously carried out in the presence of a photoinitiator capable of intitiating radical crosslinking. The photoinitiator is advantageously added to the prepolymers of the invention before introduction into the mould, preferably by mixing the polymers and the photoinitiator together. The amount of photoinitiator can be chosen within wide limits, an amount of up to 0.05 g/g of polymer and especially of up to 0.003 g/g of polymer having proved advantageous.

It is to be emphasised that according to the invention the crosslinking can be effected in a very short time, for example in $\leq 60$ minutes, advantageously in $\leq 20$ minutes, preferably in $\leq 10$ minutes, especially in $\leq 5$ minutes, more especially in $\leq 1$ minute and most especially in $\leq 30$ seconds.

Opening of the mould so that the moulding can be removed from the mould can be carried out in a manner known per se.

When the moulding produced according to the invention is a contact lens and when the latter has been produced without a solvent from a previously purified prepolymer of the invention, then it is generally not necessary, after removing the moulding, to carry out subsequent purification steps, for example extraction. This is because the prepolymers used do not contain any undesirable low-molecular-weight constituents; consequently, the crosslinked product is also free or substantially free of such constituents and subsequent extraction is unnecessary. Accordingly, the contact lens can be converted directly into a ready-to-use contact lens in customary manner by hydration. Suitable forms of hydration, by means of which ready-to-use contact lenses having different water contents are obtainable, are known to the person skilled in the art. The contact lens is swelled, for example, in water, in an aqueous salt solution, especially in an aqueous salt solution having an osmolarity of approximately from 200 to 450 milliosmol in 1000 ml (unit: mOsm/l), preferably approximately from 250 to 350 mOsm/l and especially approximately 300 mOsm/l, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts that are customary in the field of contact lens care, for example phosphate salts, or agents for establishing isotonicity that are customary in the field of contact lens care, such as, especially, alkali metal halides, for example sodium chloride, or solutions of mixtures thereof. An example of an especially suitable salt solution is a synthetic, preferably buffered lachrymal fluid that is adapted to natural lachrymal fluid as regards pH and osmolarity, for example an unbuffered sodium chloride solution, preferably a sodium chloride solution that is buffered, for example buffered with phosphate buffers, and the osmolarity and pH of which correspond to the osmolarity and pH of human lachrymal fluid.

The hydration fluids defined above are preferably pure, that is to say free or substantially free of undesirable constituents. Special preference is given to pure water or to a synthetic lachrymal fluid as described above.

When the moulding produced according to the invention is a contact lens and when the latter has been produced from an aqueous solution of a previously purified prepolymer of the invention, then the crosslinked product does not contain any troublesome impurities either. Subsequent extraction is therefore unnecessary. Since the crosslinking is carried out in a substantially aqueous solution, subsequent hydration is also unnecessary. The contact lenses obtainable according to that process are therefore distinguished, according to an advantageous embodiment, by the fact that they are suitable for their designated use without extraction. In this connection, designated use is understood as meaning especially that the contact lenses can be inserted into the human eye.

The contact lenses obtainable according to the invention have a range of unusual and extremely advantageous properties. Of those properties there may be mentioned, for example, their excellent tolerability by the human cornea, which is based on a balance of water content, oxygen permeability and mechanical properties. Moreover, the contact lenses of the invention exhibit a high degree of dimensional stability. No changes in shape were discernible even after autoclaving at, for example, about 120° C.

It can also be emphasised that the contact lenses of the invention, that is to say especially those comprising a crosslinked polymer of a prepolymer comprising units of formula (1) and, where appropriate, (1a), can be produced in a very simple and efficient manner as compared with the prior art. This is the result of several factors. Firstly, the starting materials are inexpensive to obtain or prepare. Secondly, there is the advantage that the prepolymers are surprisingly stable, so that they can be subjected to a high degree of purification. Accordingly, it is possible to use for the crosslinking a polymer that requires virtually no subsequent purification, such as, especially, the complicated extraction of unpolymerised constituents. Moreover, the crosslinking can be carried out without a solvent or in an aqueous solution, so that the subsequent exchange of solvents or the hydration step, respectively, is not required. Finally, the photopolymerisation takes place in a short time, so that the process for the production of the contact lenses of the invention can be made extraordinarily economical from that point of view also.

All the advantages mentioned above naturally apply not only to contact lenses but also to other mouldings according to the invention. The sum of the various advantageous aspects in the production of the mouldings of the invention leads to the mouldings of the invention being suitable especially as mass-produced articles, for example as contact lenses that are worn for a short period of time and are then replaced by new lenses.

In the Examples which follow, unless expressly indicated to the contrary, quantities are by weight and temperatures are given in degrees Celsius. Unless indicated otherwise, molecular weights $M_n$ are determined by means of gel permeation chromatography (GPC) [size exclusion chromatography (SEC)] using DMF as solvent, and are related to the calibration standard of polymethyl methacrylate (PMMA).

PREPARATION EXAMPLES

Example 1

(a) 63.7 g of polyethylene glycol 600 diacid dichloride (prepared by reacting polyethylene glycol 600 diacid with thionyl chloride) are dissolved in 500 ml of toluene. 1.6 g of tetrabutylammonium bromide (TBAB) and 20.2 g of diglycidyl ether of butane-1,4-diol are added thereto and the mixture is heated to 90° C., with stirring. When the epoxy groups have reacted completely (which takes about 2 hours), the product is precipitated from tert-butyl methyl ether in the form of a yellow oil.

(b) 25.2 g of the product prepared according to (a) are dissolved in 200 ml of DMSO. 19.5 g of acrylic acid and 41.1 g of 1,8-diazabicyclo[5.4.0]undec-7-ene (DBU) are added thereto and the mixture is heated to 70° C., with stirring. After 24 hours at that temperature, 300 ml of water are added to the clear brown reaction mixture. The product is extracted with chloroform and the organic phase is washed first with 0.1N hydrochloric acid and then with 5% strength $NaHCO_3$ solution. After removal of the solvent, a polymer comprising structural units of the formula

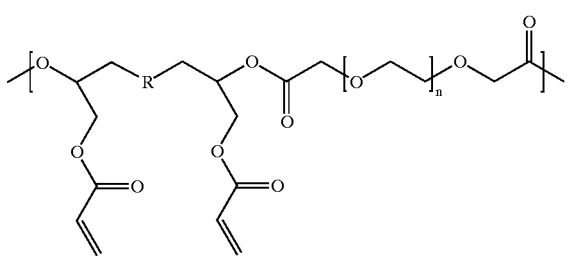

wherein R is the radical —O—(CH$_2$)$_4$—O— and n≈14, is obtained in the form of a viscous yellow oil (M$_n$=3000, M$_w$=4000).

Example 2

(a) 120 g of diglycidyl ether of polyethylene glycol 600 are dissolved in 100 ml of toluene. 3.2 g of TBAB and 36.6 g of adipic acid dichloride are added thereto and the mixture is heated to 90° C., with stirring. When the epoxy groups have reacted completely (which takes about 1 hour), the product is precipitated from tert-butyl methyl ether in the form of a yellow oil.

(b) 23.5 g of the product prepared according to (a) are dissolved in 200 ml of DMSO. 25.8 g of methacrylic acid and 41.1 g of DBU are added thereto and the mixture is heated to 90° C., with stirring. After 24 hours at that temperature, the reaction mixture is diluted with 300 ml of water and the product is then extracted therefrom with chloroform. The organic phase is washed with 0.1N hydrochloric acid and then with 5% strength NaHCO$_3$ solution. After removal of the solvent, a polymer comprising structural units of the formula

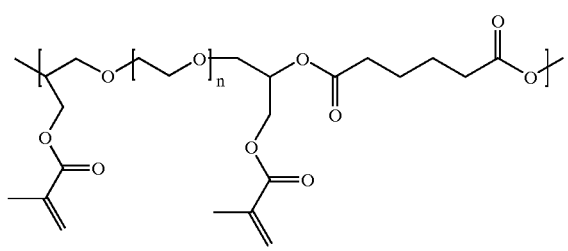

(n≈14)

is obtained in the form of a viscous yellow oil (M$_n$=3800, M$_w$=4900).

Example 3

Reaction of 70 g of diglycidyl ether of polyethylene glycol 1000 with 12.8 g of adipic acid dichloride, with the addition of 1.1 g of TBAB, by the process according to Example 2(a), and reaction of 26.5 g of the resulting product with 17.4 g of methacrylic acid, with the addition of 30.7 g of DBU, according to Example 2(b) yields a polymeric oil comprising structural units of the formula indicated in Example 2 wherein n≈23(M$_n$=3300, M$_w$=4200).

Example 4

23.5 g of the product obtained according to Example 2(a) are dissolved in 200 ml of DMSO. 20.6 g of glycolic acid and 41.2 g of DBU are added thereto and the mixture is heated to 90° C., with stirring. After 24 hours at that temperature, the reaction mixture is diluted with 300 ml of water and the product is then extracted therefrom with chloroform.

23.9 g of the product so prepared are dissolved in 170 ml of dioxane, and 0.18 g of N,N-dimethylcyclohexylamine is added thereto while introducing air. 43 g of isocyanatoethyl methacrylate, dissolved in 40 ml of dioxane, are added dropwise thereto and the mixture is then heated at 80° C. for 5 hours. At the end of that time, the product is precipitated from tert-butyl methyl ether, yielding a polymer comprising structural units of the formula

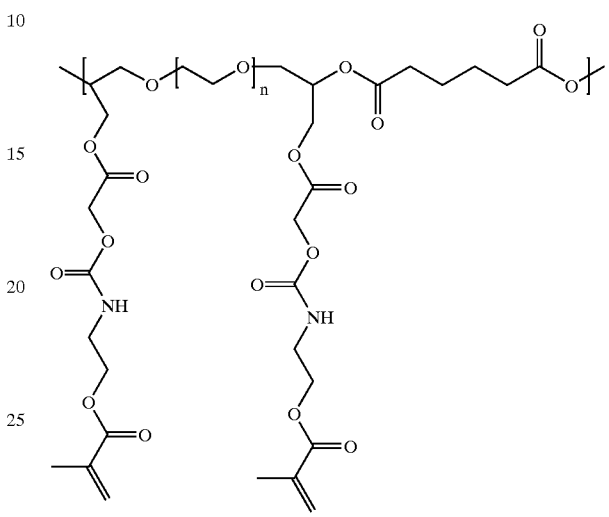

(M$_n$=5990, M$_w$7350).

APPLICATION EXAMPLES

Example 5

1.5 mg of Irgacure® 2959 are dissolved in 0.5 g of the polymer obtained according to Example 1. A 0.1 mm thick film is prepared from the clear viscous solution between two glass plates having spacers. The film is irradiated for 1.5 minutes using a Hönle lamp. A clear, flexible film is obtained which swells in water to form a clear hydrogel having a water content of 40%.

Example 6

3 mg of Irgacure® 2959 are dissolved in 1 g of the polymer obtained according to Example 2. A 0.1 mm thick film is prepared from the clear viscous solution between two glass plates having spacers. The film is irradiated for 1.5 minutes using a Hönle lamp. A clear, flexible film is obtained which swells in water to form a clear hydrogel having a water content of 40%.

Example 7

3 mg of Irgacure® 2959 are dissolved in 1 g of the polymer obtained according to Example 3. A 0.1 mm thick film is prepared from the clear viscous solution between two glass plates having spacers. The film is irradiated for 30 seconds using a Hönle lamp. A clear, solid film is obtained.

What is claimed is:

1. A prepolymer which is a linear polyester having pendent crosslinkable groups of the formula —CH$_2$—R and comprising structural units of the formula

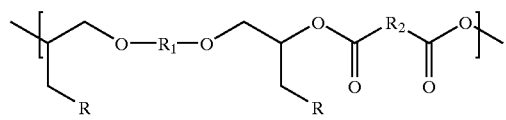

(1)

wherein R is a radical selected from the group consisting of

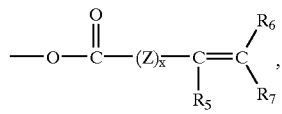

(2a)

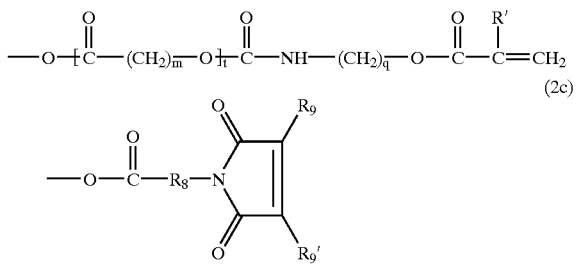

(2b)

(2c)

and

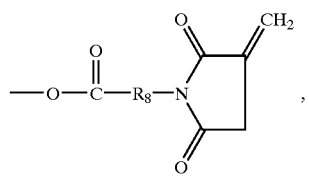

(2d)

Z is straight-chained or branched $C_1$–$C_{12}$alkylene or unsubstituted or $C_1$–$C_4$alkyl- or $C_1$–$C_4$alkoxy-substituted phenylene or $C_7$–$C_{12}$aralkylene, x and t are each independently of the other the number 0 or 1, $R_5$ is hydrogen, $C_1$–$C_4$alkyl or halogen, $R_6$ is hydrogen, $C_1$–$C_4$alkyl, phenyl, carboxy or halogen, $R_7$ is hydrogen when $R_6$ is phenyl or carboxy, or is hydrogen or carboxy when $R_6$ is hydrogen, $C_1$–$C_4$alkyl or halogen, $R_8$ is a $C_2$–$C_{12}$alkylene radical, a phenylene radical or a $C_7$–$C_{12}$aralkylene radical, $R_9$ and $R_9'$ are each independently of the other hydrogen, $C_1$–$C_4$alkyl or halogen, $R_1$ is a radical of the formula

  (3a) or

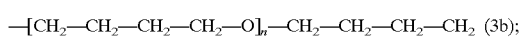  (3b);

or an alkylene radical having up to 20 carbon atoms which may be interrupted by one or more ester, urethane or ureido groups and/or may be substituted by hydroxy; or a cycloalkylene radical having from 6 to 20 carbon atoms; or an arylene radical having from 6 to 20 carbon atoms; or an arylenealkylene, alkylenearylene, alkylenearylenealkylene or arylenealkylenearylene radical, $R_2$ is a radical of the formula

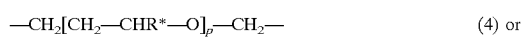  (4) or

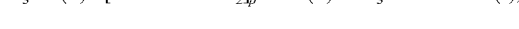  (5);

or an alkylene radical having up to 20 carbon atoms which may be interrupted by one or more ester, urethane or ureido groups and/or may be substituted by hydroxy; or a cycloalkylene radical having from 6 to 20 carbon atoms; or an arylene radical having from 6 to 20 carbon atoms; or an arylenealkylene, alkylenearylene, alkylenearylenealkylene or arylenealkylenearylene radical, R', R" and R* are each independently of the others hydrogen or $C_1$–$C_4$alkyl, $R_3$ is an alkylene radical having up to 20 carbon atoms; or a cycloalkylene radical having from 6 to 20 carbon atoms; or an arylene radical having from 6 to 20 carbon atoms, and n, m, p and q are each independently of the others a number from 1 to 30, with the proviso that at least one of the radicals $R_1$ and $R_2$ is a radical of formula (3a), (3b), (4) or (5).

2. A prepolymer according to claim 1, wherein R is a radical of the formula

  (2a') or

  (2b'), $R_5$ and R' are each independently of the other hydrogen or $C_1$–$C_4$alkyl, and m and q are each independently of the other a number from 1 to 30.

3. A prepolymer according to claim 2, wherein R is a radical of formula (2a') wherein $R_5$ is hydrogen or methyl.

4. A prepolymer according to claim 1, wherein $R_1$ is a radical of formula (3a) or (3b) indicated in claim 1, $C_1$–$C_{20}$alkylene, 1,2-, 1,3- or 1,4-phenylene, or a radical of the formula

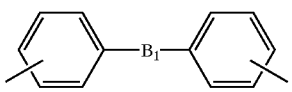

wherein $B_1$ is straight-chained or branched $C_1$–$C_4$alkylene.

5. A prepolymer according to claim 1, wherein $R_1$ is a radical of formula (3a) indicated in claim 1, or is $C_1$–$C_{20}$alkylene.

6. A prepolymer according to claim 1, wherein $R_2$ is a radical of formula (4) or (5) indicated in claim 1, $C_1$–$C_{20}$alkylene, 1,2-, 1,3- or 1,4-phenylene, or a radical of the formula

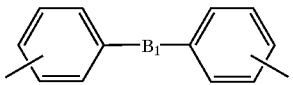

wherein $B_1$ is straight-chained or branched $C_1$–$C_4$alkylene.

7. A prepolymer according to claim 1, wherein $R_2$ is a radical of formula (4) indicated in claim 1, or is $C_1$–$C_{20}$alkylene.

8. A prepolymer according to claim 1, wherein $R_1$ is a radical of formula (3a) indicated above and $R_2$ is a $C_1$–$C_{20}$alkylene radical.

9. A prepolymer according to claim 1, wherein $R_1$ is a $C_1$–$C_{20}$alkylene radical and $R_2$ is a radical of formula (4) indicated above.

10. A prepolymer according to claim 1 which comprises, in addition to the structural units of formula (1), structural units of the formula

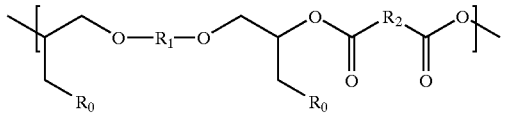 (1a)

wherein $R_0$ is halogen or a radical —O—(O)C—$R_4$ and $R_4$ is $C_1$–$C_{20}$alkyl, $C_6$–$C_{20}$cycloalkylene, $C_6$–$C_{20}$arylene or $C_7$–$C_{12}$aralkylene.

11. A prepolymer according to claim 10, wherein $R_0$ is halogen.

12. A process for the preparation of a prepolymer according to claim 1, which comprises (a) polymerising a compound of the formula

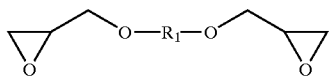 (6)

with a compound of the formula

X(O)C—$R_2$—C(O)X (7)

in the presence of a catalyst, and (b) reacting the polymer obtained according to (a), which comprises structural units of the formula

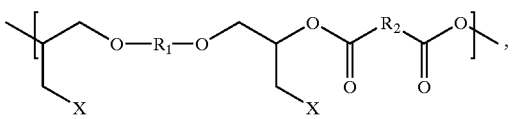 (1a)

with a compound of the formula

R—H (8)

in the presence of a base, $R_1$ and $R_2$ each being as defined in claim 1, X being halogen, preferably chlorine, and R being a radical of formula (2a), (2c), (2d) or (2b) indicated in claim 1 wherein t is the number 1.

13. A polymer obtained by crosslinking a prepolymer according to claim 1 in the absence or presence of an additional vinyl comonomer.

14. A polymer according to claim 13 that is produced by photocrosslinking a prepolymer according to claim 1 in the absence of an additional vinyl comonomer.

15. A polymer according to claim 13 obtained by photocrosslinking a prepolymer according to any one of claims 1 to 11 in the presence of from 0.5 to 80 units of an additional vinyl comonomer per unit of formula (1).

16. A process for the preparation of a polymer according to claim 13, which comprises photocrosslinking a prepolymer according to claim 1 in the absence or presence of an additional vinyl comonomer.

17. A process according to claim 16, wherein the prepolymer is used in substantially pure form.

* * * * *